United States Patent [19]

Leibinger

[11] Patent Number: 4,571,810

[45] Date of Patent: Feb. 25, 1986

[54] INSTALLATION COMPRISING AUTOMATIC MACHINE TOOLING AND SORTING APPARATUS

[75] Inventor: Berthold Leibinger, Gerlingen, Fed. Rep. of Germany

[73] Assignee: Trumpf America, Inc., Farmington, Conn.

[21] Appl. No.: 574,347

[22] Filed: Jan. 27, 1984

[51] Int. Cl.[4] .............................................. B23P 17/00

[52] U.S. Cl. ....................................................... 29/412

[58] Field of Search ................ 219/121 L; 83/71, 104, 83/167; 364/474, 475; 209/933, 706; 29/412, 701–703

[56] References Cited

U.S. PATENT DOCUMENTS

| | | | |
|---|---|---|---|
| 1,409,169 | 3/1922 | Hadaway . | |
| 2,364,011 | 11/1944 | Wales . | |
| 3,313,410 | 4/1967 | Gardner . | |
| 3,322,273 | 5/1967 | Bailey . | |
| 3,518,908 | 7/1970 | Daniels | 83/71 |
| 3,534,853 | 10/1970 | Seaman . | |
| 3,830,121 | 8/1974 | Makeev et al. | 83/104 |
| 4,040,318 | 8/1977 | Makeev et al. | 83/104 |
| 4,108,032 | 8/1978 | Scheib et al. . | |
| 4,224,850 | 9/1980 | Holmi et al. . | |
| 4,249,436 | 2/1981 | Clay . | |
| 4,474,094 | 10/1984 | Hanni et al. | 83/104 |

FOREIGN PATENT DOCUMENTS

| | | | |
|---|---|---|---|
| 3107332 | 9/1982 | Fed. Rep. of Germany | 29/703 |

*Primary Examiner*—Mark Rosenbaum
*Assistant Examiner*—Steven Nichols

[57] ABSTRACT

A machine tool installation enables the production of a variety of parts from a workpiece, and sorting of the parts so produced, on a fully automated basis. The machine tool has a numerical control system by which its cutting tool is caused to act upon the workpiece to selectively produce any of a number of different parts. The same control system is concurrently utilized to operate a sorting unit to position the designated one of several receptacles provided thereon to a point adjacent a common discharge location from the machine tool. The different parts produced are thereby segregated into substantially homogenous batches within the several receptacles provided.

7 Claims, 5 Drawing Figures

INSTALLATION COMPRISING AUTOMATIC MACHINE TOOLING AND SORTING APPARATUS

BACKGROUND OF THE INVENTION

Highly sophisticated machine tools are presently known, by which a variety of parts can be produced from a workpiece on a completely automated basis and without need for any manual change of tooling. Cutting may be accomplished mechanically in such machinery and/or by plasma or laser effects, and generally tooling changes and operation will be effected by a numerical control system, or the like. Machines of this nature are available from Trumpf America Inc., of Farmington, Conn.

The several parts produced by such automatic machine tools are typically delivered to a collection point, from which they are discharged for subsequent sorting. This is of course time-consuming, particularly when manual sorting operations are involved, and is undesirable from the standpoint of achieving maximum efficiency in and automation of the manufacturing operations.

Accordingly, it is an object of the present invention to provide a novel automatic machine tool installation for producing a variety of parts from a workpiece and for automatically sorting them, and a novel method for achieving those results.

It is also an object of the invention to provide such an installation wherein the sorting unit employed is of relatively simple and yet efficient design, and wherein a minimum amount of modification to the existing automatic machine tool is necessary to enable its use in combination with such a sorting unit.

SUMMARY OF THE INVENTION

It has now been found that certain of the foregoing and related objects of the present invention are readily attained in an automatic installation comprising a machine tool, and a sorting unit associated therewith and disposed adjacent thereto. The machine tool includes control means for controlling the action of a cutting tool on the workpiece to selectively produce a multiplicity of different parts from a workpiece, and for delivering the parts produced to a common location. The sorting unit comprises a base, a table movably mounted upon the base, a multiplicity of receptacles disposed at spaced positions on the table, and drive means for moving the table upon the base to locate a selected one of the receptacles adjacent the common location of the machine tool to receive parts therefrom. The machine tool control means also serves to control the drive means of the sorting unit in relation to operation of the machine tool, to cause the table to move to a different one of its positions corresponding to a selected one of the different parts produced by the tool. As a result, the installation is adapted to produce a variety of parts from a workpiece, and to segregate them into different, substantially homogeneous batches within the receptacles provided.

Generally, the sorting unit will have a turntable for mounting the receptacles at angularly spaced positions about its axis of rotation, and will be rotated to different positions by the drive means and in response to the control means. In preferred embodiments, the turntable will have six, equidistantly spaced positions, and the machine tool will comprise an automatic press, most desirably including a laser cutting tool, operated by a numeric control system.

Other objects of the invention are attained by the provision of an automatic production and sorting method, utilizing a machine tool and sorting unit having the features described. In the method, a first signal is generated in the control system of the machine tool to effect production of a first part from a workpiece. The signal is concurrently utilized to control the action of the drive means of the sorting unit so as to position a first designated one of the receptacles on the turntable thereof adjacent the common discharge location of the machine tool, to receive the first part therefrom. A second signal is thereafter generated in the machine tool control system to effect the production of a second part from the workpiece, and is concurrently used to control the action of the drive means to reposition the turntable so as to dispose a second designated one of the receptacles adjacent the common location of the machine tool, to receive the second part therefrom.

DETAILED DESCRIPTION OF THE ILLUSTRATED EMBODIMENT

Figure 1:
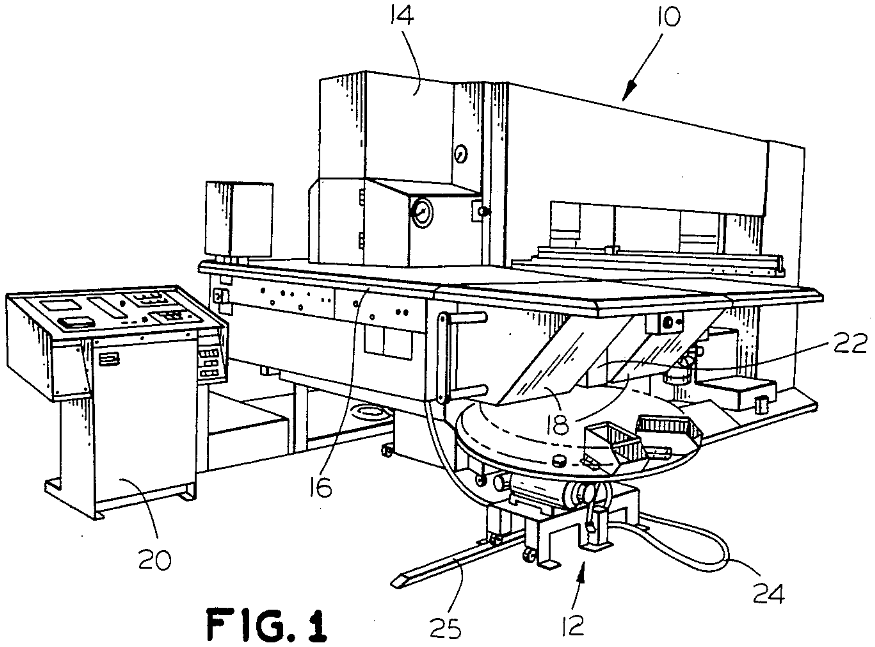
FIG. 1 is a perspective view of a punch press installation embodying the sorting unit of the present invention, by which a variety of ports can automatically be produced by the press and sorted in the sorting unit.

Turning now in detail to FIG. 1 of the appended drawings, therein illustrated is an automatic punch press installation embodying the present invention and consisting of a punch press, generally designated by the numeral 10, and a sorting unit, generally designated by the numeral 12. The punch press 10 is capable of automatically producing a multiplicity of different parts (the term "parts" being used herein and in the appended claims to include scrap produced, as well as the desired pieces), generally by performing mechanical punching, plasma cutting, laser cutting, and like operations upon a sheet metal workpiece. The cutting tools (not shown) are disposed within the press portion 14 of the machine tool 10, and act upon the workpiece as it moves across the table 16, the cut pieces and scrap product (i.e., the parts) being deposited into the bins 18 located at the end of the table. A discharge chute 22 is located between the two bins 18, from which the parts produced are delivered (by means not shown) for discharge to the underlying adjacent sorting unit 12.

Automatic operation of the cutting tools upon the workpiece is controlled by a conventional numerical control system (not shown in FIG. 1, but schematically illustrated in FIG. 5) with operator input being made at the console 20. The control sytem of the sorting unit 12 interconnects with the main control system of the punch press through the cable 24. Generally, the numerical control system will control the operation of the press and the movement of the workpiece, relative to the work station, to effect the desired pattern of punching on the workpiece.

Figure 2:
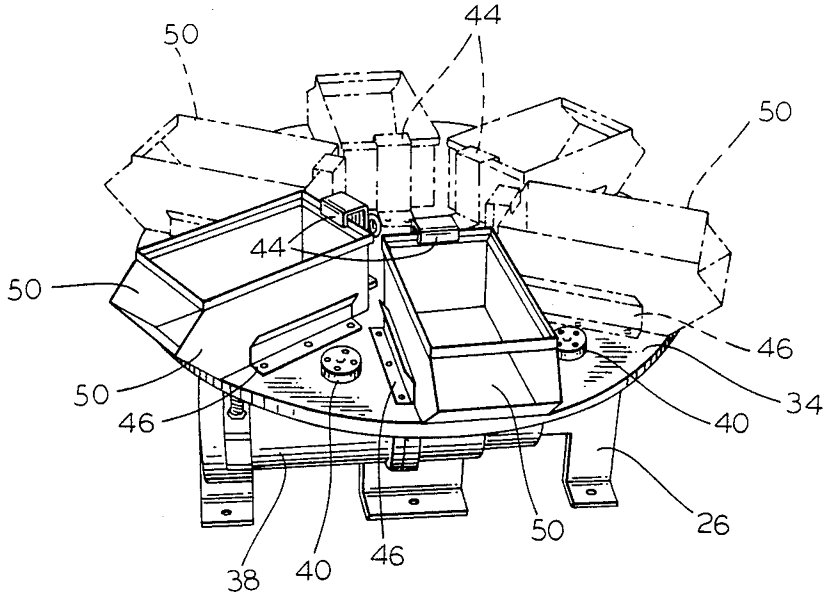
FIG. 2 is an overhead perspective view of the sorting unit used in the installation of FIG. 1, drawn to an enlarged scale.
Figure 3:
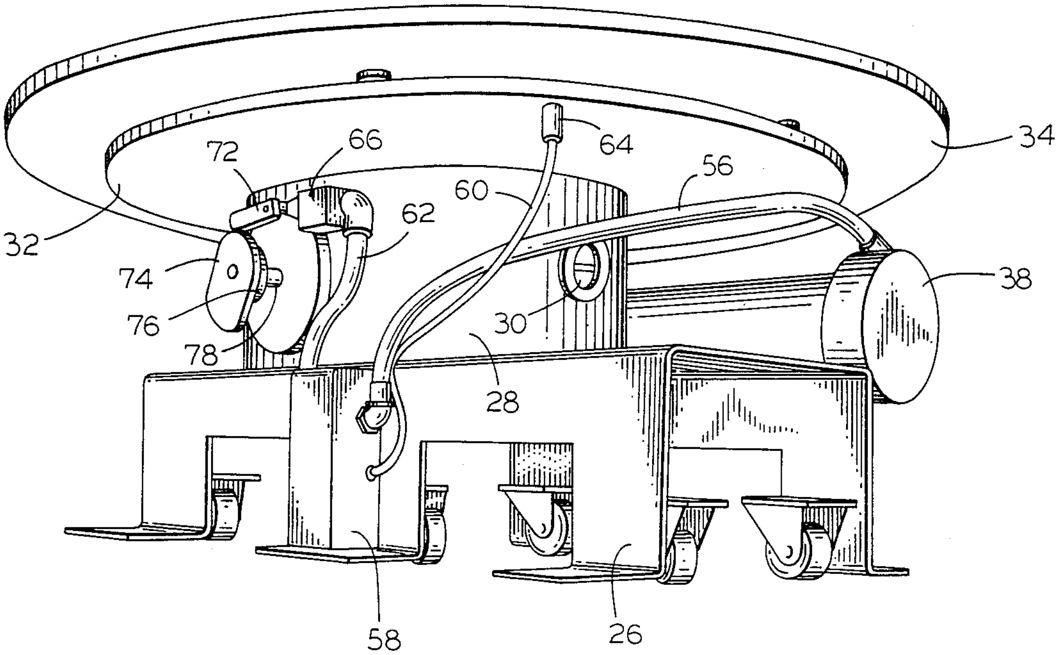
FIG. 3 is a perspective view of the sorting unit, taken from beneath the indexing table and drawn to a scale further enlarged from that of FIG. 2.
Figure 4:
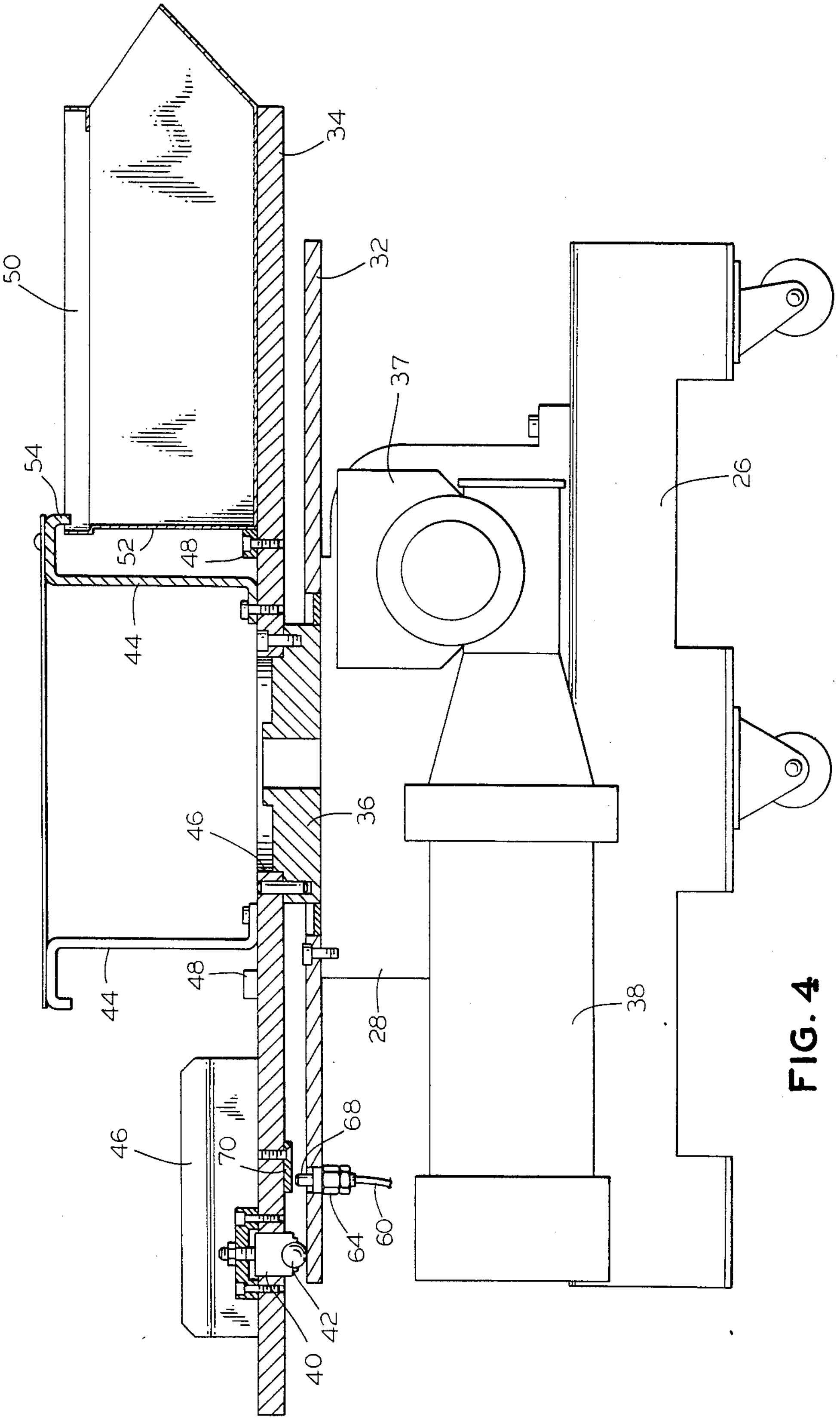
FIG. 4 is a side elevational view of the sorting unit, drawn to a greatly enlarged scale and in partial section.

With additional reference now to FIGS. 2–4, it can be seen that the sorting unit 12 includes a base 26, which is mounted upon wheels 24 to facilitate movement of the unit from beneath the overhanging bins 18 along the track 25. An upstanding pedestal portion 28 is mounted upon the base 26, and supports the circular bearing plate 32 thereupon. A circular indexing table 34 mounts a hub member 36 within its central opening 46, by which operative connection of the table 34 (through a gear train, not shown), is made to a drive motor 38 through gear box 37 and the pedestal portion 28, the latter having a lubricant level sight gauge 30 provided therein. A series of six ball bearing assemblies 40 (two of which are visible in FIG. 2, one being shown in detail in FIG. 4) are mounted at equidistantly angularly spaced locations about the indexing table 34, and project downwardly to hold the ball elements 42 thereof against the top surface of bearing plate 32, to provide low-friction support for the rotating indexing table 34 thereupon.

Six holding brackets 44 are affixed on the upper surface of the table 34 at locations spaced equidistantly about the central opening 46, and are positioned on radial centerlines between six pairs of cooperating retaining plates 46. An elongated stop bar 48 is also affixed to the upper surface of the table 34 at the inner end of the channel defined between each pair of retaining plates 46, at the base of the corresponding bracket 44. Thus, the brackets 44, the retaining plates 46, and the stop bars 48 cooperate to secure the bins 50 at 60° intervals about the table 34, to provide six stations for receiving parts produced by the machine 10. Attachment of the bins 50 is achieved by engaging the upper edge portion of the rear wall 52 under the depending flange portion 54 of one of the holding brackets 44, and pivoting the bin downwardly between the opposing plates 46 to bring its lower edge portion into abutment against the corresponding stop bar 48. The retaining plates 46 are configured to exert a substantial inward force upon the sides of the boxes 50, thereby frictionally engaging them and holding them securely in place on the top of the table 34, but permitting ready release and removal when so desired.

The cable 56 connects the drive motor 38 to a suitable power source (not shown) through the junction box 58 mounted upon the base 26 of the unit 12. Also connected through the junction box 58 are electrical conduits 60, 62, attached respectively to a home proximity switch 64 mounted within the circular bearing plate 32, and an indexing switch 66 mounted upon the pedestal portion 28. As seen in FIG. 4, the proximity switch 64 is operated through an upwardly projecting spring-loaded plunger 68, which is disposed for contact by a cam plate 70 suitably positioned on the underside of the indexing table 34. Indexing switch 66 has a laterally extending operating arm 72, which is disposed to ride upon the edge of the oblong lobe 74 of an indexing cam unit 76, the latter being mounted upon a transversely extending shaft 78 in meshing engagement with a driven shaft (not shown) connecting the indexing table to the motor 38. Preferably, the cam unit 76 will comprise a multi-position switch of the type having an internal mechanism for altering the ratio of revolutions that exists between shaft 78 and the lobe 74, to thereby correlate operation of the switch 66 to the stations of the table 34; such a unit is commercially available from the Ferguson Machine Company, of St. Louis, Mo.

As indicated previously, the sorting unit 12 is operated in conjunction with the punch press 10 by utilizing the numerical control system of the latter to control the operations of both. Thus, the numerical control system is programmed so as to cause the turntable 34 to rotate to a selected position corresponding to a particular part produced by the punch press 10.

Figure 5:
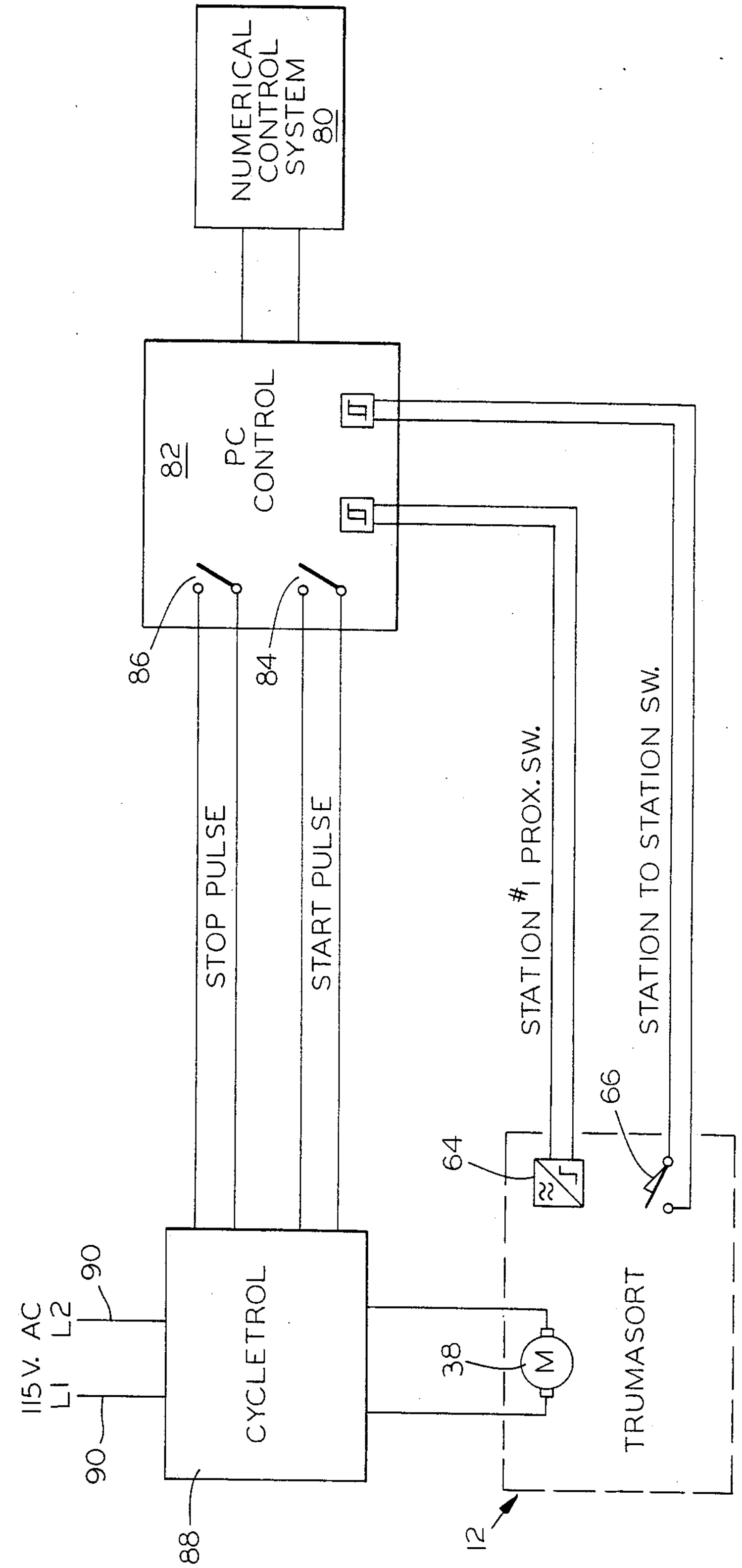
FIG. 5 is a schematic representation of the control system for the installation, by which the sorting unit is operated in conjunction with the punch press.

The control system for the punch press 10 is designated 80 in FIG. 5, and is connected to a printed circuit control panel 82 for the sorting unit 12; as will be appreciated, the control panel 82 can obviously be an integral part of the control system 80, if so preferred. In any event, the control panel 82 will incorporate a start pulse function, represented by the switch 84 and its associated circuitry, and a stop pulse function, represented by the switch 86 and its circuitry. The lines from the switches 84, 86 connect the control panel 82 to a motor control unit 88, through which current from line 90 is provided to the motor 38 of the unit 12 (depicted as a box in this Figure). The indexing switch 66 and home proximity switch 64 are also schematically illustrated therein, and connecting circuitry is shown for feedback of appropriate signals to the control board 82.

By virtue of a signal from the home proximity switch 64, the main control system 80 of the installation is able to sense (at least at the commencement of operations) the angular orientation of the indexing table 34, and hence to monitor the positions of the bins 50 at the several stations thereof. When the control system 80 instructs the machine tool 10 to produce a certain part, and senses that the corresponding bin is not in position beneath the discharge chute 22, the switch 84 of the control panel 82 will be effectively closed by the system 80, thereby actuating the motor 38 through the control unit 88. As the shaft 78 of the sorting unit 12 rotates, the lobe 74 of the cam unit 76 operates the arm 72 of the indexing switch 66, thereby generating a signal representative of each 60° segment of rotation of the indexing table 34, as is readily achieved through the establishment of appropriate mechanical relationships within the unit 76. The resultant signal, fed back to the panel 82, allows the control system 80 to determine the number of stations that have passed the discharge point; this in turn enables deactivation of the motor 38 through the stop pulse switch 86 when the designated bin, corresponding to the particular part produced, is disposed to receive it. A subsequent cycle will be initiated in response to a signal received from the control system 80 when the command for next part is generated.

It will of course be appreciated that the numerical control system shown schematically in FIG. 5 is merely exemplary, and that the nature of the logic system used for that purpose in any specific case can differ substantially, as will be evident to those skilled in the art; tapes, discs, and cartridges may be used to effect the programming of the press. Similarly, the mechanical sorting unit described in connection with the illustrated embodiment may be substituted by many equivalent systems and, for example, positional monitoring control of the indexing table can be achieved by purely electronic means, if so desired. As mentioned above, the machine tool comprising the installation may also vary widely. Perhaps it should be emphasized that a fundamental feature of the invention concerns the ability to operate the sorting unit in response to the same control means that is utilized for the machine tool, to thereby enable the automatic segregation described.

Thus, it can be seen that the present invention provides a novel automatic installation for producing a variety of parts from a workpiece, and for sorting the parts produced, and a novel method for achieving those results. The installation is of relatively simple and yet efficient design, and only a minimal amount of modification to existing automatic machine tooling is necessary to enable its use for carrying out such automated operations.

Having thus described the invention, what is claimed is:

1. In an automatic installation for producing a variety of parts from a workpiece and for sorting the parts so produced, the combination comprising:

A. a machine tool for producing a multiplicity of different parts from a workpiece, said tool including control means for controlling the action of a cutting tool thereupon to selectively produce a multiplicity of different parts from a workpiece, and for discharging the parts produced at a common location; and B. a sorting unit associated with and disposed adjacent said machine tool, said unit comprising (i) a base;

(ii) a turntable rotatably mounted upon said base for movement about said common location for discharge of the parts;

(iii) a multiplicity of receptacles disposed on said turntable at each of a multiplicity of angularly spaced positions about the axis of rotation, said receptacles being dimensioned and positioned to receive parts discharged from said machine at said common location upon movement of said turntable to locate receptacle thereat;

(iv) drive means for rotating said turntable upon said base to locate a selected one of said receptacles adjacent said common location of said machine tool to receive parts therefrom;

said control means of said machine tool also controlling said drive means of said sorting unit in relation to the operation of said machine tool to cause said turntable to rotate to locate a different one of said receptacles corresponding to a selected one of the different parts produced by said machine tool adjacent said common location to receive parts discharged therefrom, whereby said installation can produce a variety of parts from a workpiece and can segregate the parts into different, substantially homogeneous batches within said receptacles.

2. The installation of claim 1 wherein said machine tool includes an automatic punch press work station operated by a numerical control logic system.

3. The installation of claim 2 wherein said press includes a laser cutting work station.

4. The installation of claim 1 wherein said positions of said turntable are equidistantly angularly spaced.

5. The installation of claim 4 wherein there are six of said positions.

6. In an automatic installation for producing a variety of parts from a workpiece and for sorting the parts so produced, the combination comprising:

A. a machine tool for producing a multiplicity of different parts from a workpiece, said tool including control means for controlling the action of a cutting tool thereupon to selectively produce a multiplicity of different parts from a workpiece, and for discharging the parts produced at a common location; and B. a sorting unit associated with and disposed adjacent said machine tool, said unit comprising (i) a base;

(ii) a table movably mounted upon said base for movement adjacent and to said common location for discharge of the parts;

(iii) a multiplicity of receptacles disposed on said table at each of a multiplicity of spaced positions, said receptacles being dimensioned on said table and positioned to receive parts discharged from said machine at said common location as said table moves relative thereto; and (iv) drive menas for moving said table upon said base to locate a selected one of said receptacles adjacent said common location of said machine tool to receive parts therefrom;

said control means of said machine tool also controlling said drive means of said sorting unit in relation to the operation of said machine tool to cause said table to move to locate a different one of said receptacles corresponding to a selected one of the different parts produced by said machine tool adjacent said common location to receive parts discharged therefrom, whereby said installation can produce a variety of parts from a workpiece and can segregate the parts into different, substantially homogeneous batches within said receptacles.

7. In a method for producing a variety of parts from a workpiece, the steps comprising:

A. providing an automatic machine tool having a common discharge location for the parts produced and for delivering the parts to said discharge location, said machine tool including a numerical control system for controlling the cutting operations for the selective production of a multiplicity of different parts from a workpiece;

B. providing an automatic unit for sorting the parts produced by said machine tool, said sorting unit including a rotatable turntable on which is disposed a multiplicity of receptacles at positions angularly spaced about to the axis of rotation, said receptacles being dimensioned to receive parts produced by said machine tool, and drive means for rotating said turntable to locate each of the positions thereon in registry with said discharge location;

C. locating said sorting unit adjacent said machine tool in position for movement about said discharge location to receive, from said discharge location thereof, the parts produced;

D. generating a first signal in said control system of said machine tool to effect the production of a first part from the workpiece and to effect discharge of said part therefrom;

E. utilizing said signal to concurrently control the action of said drive means of said sorting unit so as to position a first designated one of said receptacles on the turntable adjacent said common discharge location of said machine tool to receive said first part discharged therefrom;

F. thereafter generating a second signal in said machine tool control system to effect the production of a second part from the workpiece and to effect discharge the second part therefrom, said second part having dimensions different from those of said first part; and G. utilizing said second signal to concurrently control the action of said drive means to reposition said turntable, so as to dispose a second designated one of said receptacles thereon adjacent said common discharge location of said machine tool to receive said second part discharged therefrom.

* * * * *